United States Patent
Kamijyo et al.

(10) Patent No.: US 9,455,803 B2
(45) Date of Patent: Sep. 27, 2016

(54) RELAY DEVICE AND RELAY METHOD

(71) Applicant: FUJITSU LIMITED, Kawasaki-shi, Kanagawa (JP)

(72) Inventors: Masashi Kamijyo, Naka (JP); Satoru Sankoda, Kawasaki (JP); Yukio Osada, Setagaya (JP); Yuu Kumanomidou, Kawasaki (JP); Hiroshi Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 192 days.

(21) Appl. No.: 14/330,088

(22) Filed: Jul. 14, 2014

(65) Prior Publication Data

US 2015/0067434 A1   Mar. 5, 2015

(30) Foreign Application Priority Data

Aug. 27, 2013   (JP) .................................. 2013-175887

(51) Int. Cl.
*H04L 1/18* (2006.01)
*H04L 1/00* (2006.01)

(52) U.S. Cl.
CPC ..... *H04L 1/1883* (2013.01); *H04L 2001/0097* (2013.01)

(58) Field of Classification Search
CPC ............. H04L 12/581; H04L 12/5875; H04L 12/5895; H04L 1/1883; H04L 2/0097
USPC ....................................................... 714/748
See application file for complete search history.

(56) References Cited

U.S. PATENT DOCUMENTS

| | | | | |
|---|---|---|---|---|
| 8,184,641 | B2 * | 5/2012 | Alt ..................... | H04L 29/06027 370/352 |
| 2003/0028537 | A1 * | 2/2003 | Nakamura .............. | H04L 29/06 |
| 2003/0037104 | A1 | 2/2003 | Okamura | |
| 2005/0198161 | A1 * | 9/2005 | Rooke ................. | H04L 12/5875 709/206 |
| 2006/0095501 | A1 * | 5/2006 | Mochida ........... | H04L 29/06027 709/203 |
| 2013/0139225 | A1 * | 5/2013 | Saito ..................... | G06F 21/608 726/4 |

FOREIGN PATENT DOCUMENTS

| | | |
|---|---|---|
| JP | 2001-339434 | 12/2001 |
| JP | 2002-297559 | 10/2002 |

* cited by examiner

*Primary Examiner* — David Ton
(74) *Attorney, Agent, or Firm* — Staas & Halsey LLP

(57) ABSTRACT

A computer receives, using a first communication method, first data transmitted from a first information processing device. The computer transmits, using a second communication method different from the first communication method, the first data to a second information processing device different from the first information processing device. The computer receives, using the second communication method, a reception acknowledgement for the first data from the second information processing device. The computer transmits, using the first communication method, the reception acknowledgement to the first information processing device. The computer detects one of a first error and a second error. The first error is an error in communication between the computer and the first information processing device. The second error is an error in communication between the computer and the second information processing device. The computer retransmits, based on the detected error, one of reception acknowledgements transmitted to the first information processing device.

12 Claims, 16 Drawing Sheets

RELAY DEVICE AND RELAY METHOD

CROSS-REFERENCE TO RELATED APPLICATION

This application is based upon and claims the benefit of priority from the prior Japanese Patent Application No. 2013-175887 filed on Aug. 27, 2013, the entire contents of which are incorporated herein by reference.

FIELD

Exemplary embodiments of the present disclosure are related to a relay device and a relay method.

BACKGROUND

As a related technique, for example, there is a data processing device which effectively utilizes calculating resources on a network which is configured within a limited range and in which information equipment having a calculating resource enough to be lent to other equipment in addition to the usage by itself and information equipment having a calculating resource just enough to use for itself are mixed to be connected with each other.

The data processing device includes a connecting unit connected to the network configured within a limited range, a calculating resource lending unit which lends a calculating resource to a client device connected to the network, and a state notifying unit which notifies a physical status of the client device.

When it is determined, based on the notification of the status notifying unit, that the physical status of the client device is in a state where the client device is not connected to the network, the data processing device provides a service for the client device to the calculating resource which is lent to the client device by the calculating resource lending unit.

A related technique is disclosed in, for example, Japanese Laid-Open Patent Publication No. 2002-297559.

In the data processing device of the related technique, when data stored in a server located outside of a home is downloaded to the client device, data is primarily stored in the data processing device.

However, for example, when a restoring job is performed on a client device which does not have an operating system (OS) equipped with a retransmission control function for a communication error using a system image stored in a server outside a subnet, the data of the server needs to be primarily stored, which may require a larger storage capacity for storing the system image in the data processing device.

SUMMARY

According to an aspect of the present invention, provided is a computer-readable recording medium having stored therein a program for causing a computer to execute a process. In the process, the computer receives, using a first communication method, first data transmitted from a first information processing device. The computer transmits, using a second communication method different from the first communication method, the first data to a second information processing device different from the first information processing device. The computer receives, using the second communication method, a reception acknowledgement for the first data from the second information processing device. The computer transmits, using the first communication method, the reception acknowledgement to the first information processing device. The computer detects one of a first error and a second error. The first error is an error in communication between the computer and the first information processing device. The second error is an error in communication between the computer and the second information processing device. The computer retransmits, based on the detected error, one of reception acknowledgements transmitted to the first information processing device.

The objects and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
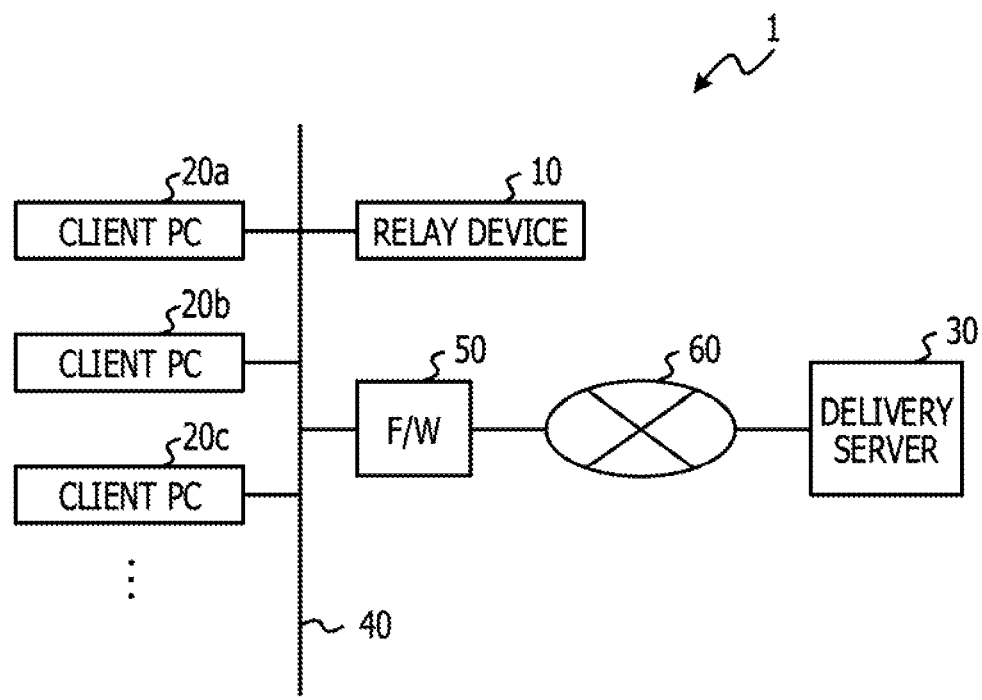
FIG. 1 is a diagram illustrating an entire configuration of a system.

Hereinafter, an embodiment of the present disclosure will be described with reference to the drawings. FIG. 1 is a diagram illustrating a configuration example of an entire system according to the present embodiment.

In FIG. 1, a delivery system 1 serving as a "first information processing device" includes a relay device 10, client personal computers (PCs) 20 serving as "second information processing devices", and a delivery server 30. The relay device 10 is connected to a plurality of client PCs 20 (20a, 20b, 20c, . . . , and so forth) through a network 40.

The relay device 10 and the client PCs 20 are disposed by a router which is not illustrated, for example, in the same subnet which is partitioned into the same segment. Therefore, the relay device 10 may perform broadcast transmission to the client PCs 20.

The relay device 10 is connected to the delivery server 30 through a network 40, a firewall (F/W) 50, and further through a network 60. The F/W 50 monitors communication between the network 40 and the network 60 to block a predetermined IP packet. The network 60 is located outside the subnet which is built in the network 40. The network 60 may be, for example, the Internet.

The client PCs 20 are targets to which data stored in the delivery server 30 is transmitted, and the client PCs 20a, 20b, and 20c may be the same model or different models.

The delivery server 30 is a server connected to the network 60 and delivers data stored therein to other devices connected thereto through the network 60. The data may be delivered, for example, as a Software as a Service (SaaS) type service which is built in a cloud. For example, a system image of a client PC 20 is stored in the delivery server 30 and the system image is transmitted in response to a delivery request.

Here, a system image refers to data which represents a state of software stored in a storage unit of a computer to operate the computer. The system image represents a program or data stored in the storage unit as an image. By preserving, as a system image, the program or data file stored in the storage unit, for example, the storage unit of the computer may be restored using the preserved system image to a state when the program or data file is preserved.

The system image preserved in the delivery server 30 may be an entire system of the client PC 20 to be restored or data stored in a specific storage unit. The system image may be only a specific program or data. The system image may be a system image in an initial state of the client PC 20 or a system image at a predetermined timing after using the client PC 20.

When the client PCs 20a, 20b, and 20c are of different models with each other, a system image for every model is stored in the delivery server 30. When a large number of models of the client PC 20 are provided, a storage capacity required for storing the system images becomes huge. Therefore, a system image for every model is stored in the delivery server 30, for example, so that a total storage capacity is small as compared with a case when the system image for every model is stored in the every relay device 10 disposed for each subnet. Further, a storage capacity of the relay device 10 may be reduced.

The system image is unitarily managed by the delivery server 30, for example, so that when a model of the client PC 20 is changed or a version of the system image is upgraded, the system image may be easily managed. Further, a transmission record may be kept for every client PC 20 so that it is easy to manage a version-up record of the client PC 20.

Next, details of the relay device 10 will be described with reference to FIGS. 2 to 16.

Figure 2:
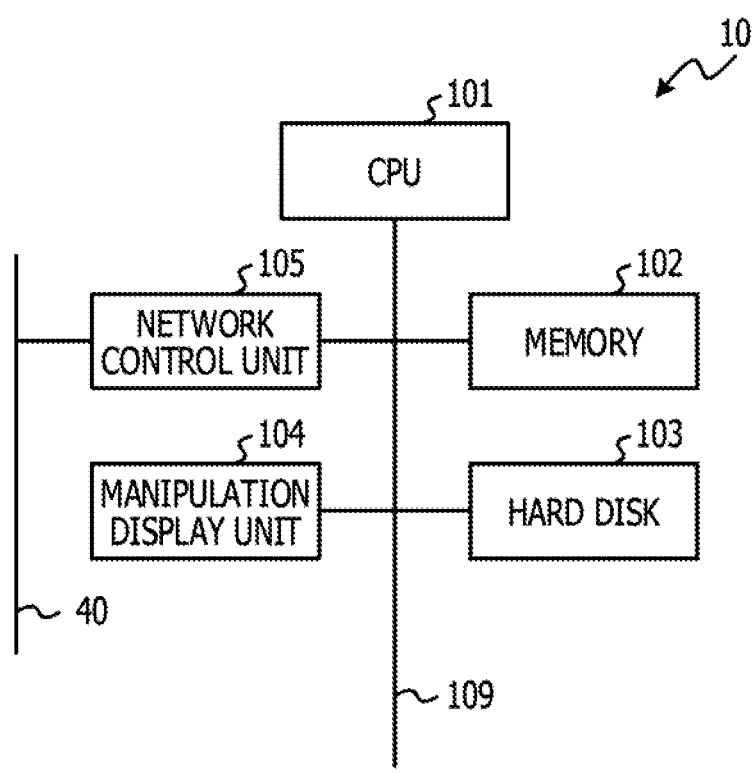
FIG. 2 is a diagram illustrating a hardware configuration of a relay device.

FIG. 2 is a diagram illustrating an example of a hardware configuration of the relay device 10 according to the present embodiment. Referring to FIG. 2, the relay device 10 includes a central processing unit (CPU) 101, a memory 102, a hard disk 103, a manipulation display unit 104, a network control unit 105, and a bus 109 to which the above-mentioned components are connected.

A program and data stored in the hard disk 103 are read out to the memory 102 to be executed by the CPU 101. In the relay device 10, a relay application serving as a "relay program" is stored in the hard disk 103 and read out to the memory 102 to be executed by the CPU 101. The CPU 101 executes the relay application to function as a relay control unit. Details of the function of the relay control unit will be described later with reference to FIG. 3 and so forth.

The manipulation display unit 104 is, for example, a touch panel, a keyboard, a mouse, or a display and is manipulated to be input by a user and displays information to the user.

The network control unit 105 controls communication through the network 40. In the present embodiment, the network control unit 105 controls a "first communication method" and a "second communication method".

The first communication method is a communication protocol which controls transmission/reception of a packet on a transport layer. In the first communication method, a session with a communication party is established before transmitting or receiving data so that a packet derived by dividing data to be transmitted or received is controlled. In order to control the packet, for example, when a reception packet is lost during the communication, a reception acknowledgement (ACK) is replied to a transmission side as a response based on a block number of the lost packet, to request the transmission side to retransmit the lost packet. When a packet of an n-th block is not received, the reception side of the packet replies the ACK corresponding to a packet of an n−1-th block so that the transmission side may retransmit the packet of the n-th block. The first communication method is, for example, a transmission control protocol (TCP).

By contrast, according to the second communication method, the divided IP packet is transmitted or received on the transport layer using a non-procedural protocol without having a handshake. The second communication method is, for example, a user datagram protocol (UDP).

In the present embodiment, the network control unit 105 controls the communication, for example, using a trivial file transfer protocol (TFTP). In the TFTP, the network control unit 105 may return, on the application layer, the ACK for the IP packet which is transmitted or received using the UDP which is the second communication method.

The network control unit 105 uses the first communication method, which is the TCP, in order to communicate with the delivery server 30 which has been described with reference to FIG. 1. Therefore, a highly reliable packet communication may be performed in the communication via the network 60.

By contrast, the network control unit 105 uses the TFTP implemented on the second communication method, that is the UDP, in order to communicate with the client PC 20.

Even a client PC 20 in which no OS is installed may obtain a system image of a TFTP server, which is stored in a server of a predetermined IP address, in accordance with a basic input/output system (BIOS) capable of the dynamic host configuration protocol (DHCP) discover. The client PC 20 may perform the TFTP communication by obtaining the system image of the TFTP server. The system image of the TFTP server may be, for example, stored in the relay device 10.

Figure 3:
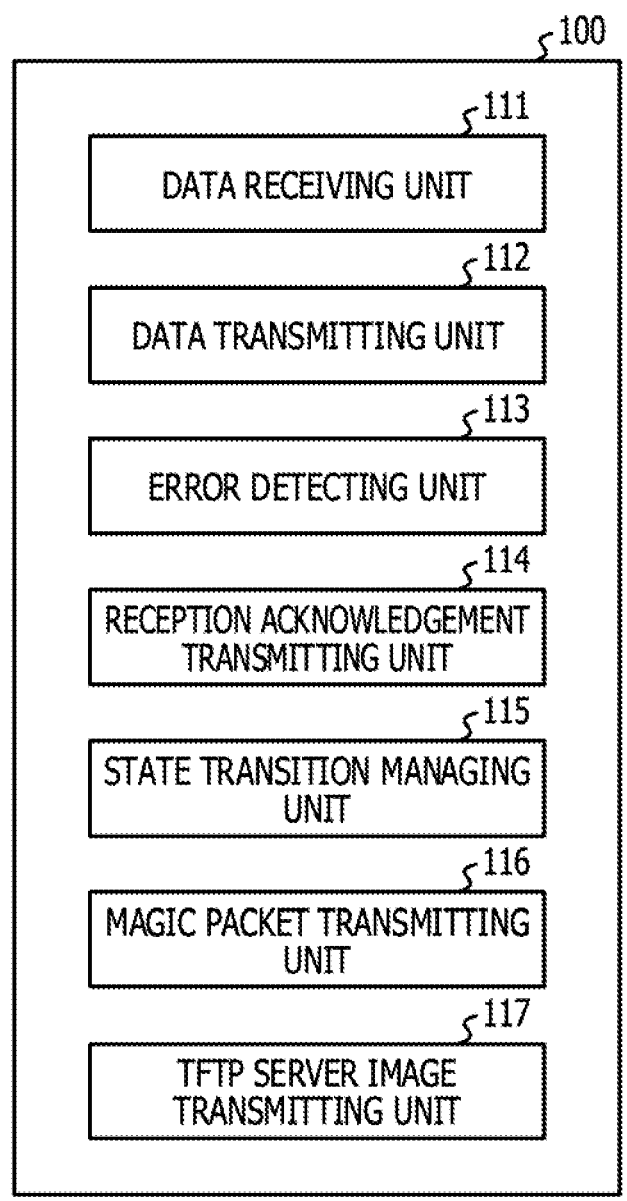
FIG. 3 is a diagram illustrating a functional configuration of a relay control unit.

Next, the function of the relay control unit will be described with reference to FIG. 3. FIG. 3 is a diagram illustrating an example of a functional configuration of a relay control unit. A relay control unit 100 is implemented by causing the CPU 101 to execute the relay application which is read out to the memory 102 which has been descried with reference to FIG. 2.

Referring to FIG. 3, the relay control unit 100 includes a data receiving unit 111, a data transmitting unit 112, an error detecting unit 113, a reception acknowledgement transmitting unit 114, a state transition managing unit 115, a magic packet transmitting unit 116, and a TFTP server image transmitting unit 117.

The data receiving unit 111 receives data which is divided into IP packets from the delivery server 30 which is connected through the network 40 and the network 60, for example, using the TCP. The packet in the TCP is controlled by the network control unit 105 illustrated in FIG. 2 and the received data is transmitted to the data receiving unit 111. The data receiving unit 111 temporarily stores the received data in the memory 102.

The data transmitting unit 112 reads out, from the memory 102, the data received by the data receiving unit 111 and transmits the read data to the client PC 20 using the TFTP implemented on the second communication method, that is, the UDP. Hereinafter, it is assumed that the second communication method includes the TFTP.

The data to be transmitted may be all or a part of the data which is received by the data receiving unit 111. When the data received by the data receiving unit 111 is an IP packet in the TCP, a packet size is determined by the value of a maximum transmission unit (MTU) which is set at the transmission side and the reception side. For example, when the MTU is 1500, a maximum packet length is 1500 bytes.

Data to be transmitted by the data transmitting unit 112 is newly divided into IP packets by the network control unit 105 to be transmitted to the client PC 20 using the TFTP. In the TFTP, a file to be transmitted is divided into 512 byte packets. The data transmitting unit 112 divides the data which is read out from the memory 102 into packets with a size appropriate for the second communication method and transmits the packets.

The error detecting unit 113 detects a communication error in the first communication method or the second communication method.

A communication error in the first communication method is a communication error between the relay device 10 and the delivery server 30. For example, the error may be a case when the reception acknowledgement transmitting unit 114, which will be described later, transmits an ACK for a packet, which is received from the delivery server 30 using the first communication method, to the delivery server 30 but the ACK is lost without reaching the delivery server 30. As another example, the error may be a case when with respect to the ACK transmitted by the reception acknowledgement transmitting unit 114, next packet data transmitted by the delivery server 30 is not received. In any case, when the ACK is transmitted to the delivery server 30 but the next packet is not received within a predetermined time, the error detecting unit 113 detects a communication error in the first communication method.

A communication error in the second communication method is a communication error between the relay device 10 and the client PC 20. For example, the error may be a case when the packet transmitted by the data transmitting unit 112 using the second communication method is lost without reaching the client PC 20 and a case when the ACK from the client PC 20 which has received the packet is lost without reaching the relay device 10. In any case, when the data transmitting unit 112 does not receive the ACK within a predetermined time after transmitting the packet to the client PC 20, the error detecting unit 113 detects the communication error in the second communication method.

When the ACK for the data transmitted to the client PC 20 by the data transmitting unit 112 using the second communication method is received from the client PC 20, the reception acknowledgement transmitting unit 114 transmits the ACK to the delivery server 30 using the first communication method.

When the error detecting unit 113 detects the communication error in the second communication method after the data transmitting unit 112 transmits, to the client, the data included in an n-th packet received by the data receiving unit 111 using the first communication method, the reception acknowledgement transmitting unit 114 transmits a ACK for an n−1-th packet, which is received immediately before the n-th packet, to the delivery server 30. Upon receiving the ACK of the n−1-th packet, the delivery server 30 retransmits the n-th packet to the relay device 10.

The relay control unit 100 retransmits the ACK for the n−1-th packet to the delivery server 30 so as to request, in place of the client PC 20, the delivery server 30 to retransmit the n-th packet using the first communication method that is used in the communication with the delivery server 30 through the network 60.

When the data receiving unit 111 receives the n-th packet using the first communication method, the reception acknowledgement transmitting unit 114 transmits an ACK for the n-th packet to the delivery server 30. At this time, it is assumed that the error detecting unit 113 detects the communication error in the first communication method. In this case, the reception acknowledgement transmitting unit 114 retransmits the ACK for the n-th packet. Upon receiving the ACK of the n-th packet, the delivery server 30 retransmits an n+1-th packet to the relay device 10.

That is, the relay control unit 100 may request, in place of the client PC 20, the delivery server 30 to retransmit the n+1-th packet using the first communication method.

The relay control unit 100 relays the transmission/reception of the packet data and requests, in place of the client PC 20, the delivery server 30 to retransmit the packet so that the relay device 10 does not need to store therein the system image having a large storage capacity. Although the relay device 10 temporarily stores packet data at the time of relaying the packet data, a required storage capacity may be reduced as compared with a case when the entire system image is stored.

The state transition managing unit 115 manages a state transition table which will be described later. The state transition managing unit 115 records the transition of the communication state in the first communication method and the transition of the communication state in the second communication method in the state transition table. The reception acknowledgement transmitting unit 114 requests to retransmit the packet by referring to the state transition table.

The magic packet transmitting unit 116 transmits a magic packet used for a wake on LAN (WOL), which remotely turns on the power, to the client PC 20 located in the same subnet connected to the network 40. The magic packet broadcasts a packet which includes a media access control (MAC) address of the client PC 20 which is a target of the WOL and a predetermined WOL code using, for example, the UDP. A network interface (I/F), which is not illustrated, of the client PC 20 monitors a MAC address of the client PC 20 and the power of the client PC 20 is turned on based on the WOL code in accordance with a BIOS, which is not illustrated, of the client PC 20.

The IP address of the relay device 10 which transmits an image of the TFTP server is written in the magic packet. After the power is turned on, the client PC 20 requests, in accordance with the BIOS, the relay device 10 having the IP address notified by the magic packet to transmit the image of the TFTP server.

The TFTP server image transmitting unit 117 transmits a program image of the TFTP server in response to the request from the client PC 20 of which power is remotely turned ON by the magic packet transmitting unit 116. Upon receiving the program image of the TFTP server, the client PC 20 stores, in accordance with the BIOS, the received image in an internal memory to enable the TFTP communication. Therefore, for example, even a client PC 20 in which no OS is installed may perform the TFTP communication.

In the present embodiment, it has been described that the functions of the relay control unit 100 are implemented by causing the CPU 101 to execute software corresponding to each functional block. However, a part of the functions of the relay control unit 100 may be implemented by hardware or middleware.

Figure 4:
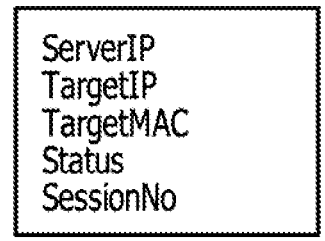
FIG. 4 is a diagram illustrating a state transition table Table-1.
Figure 5:
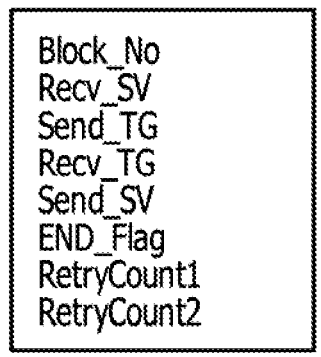
FIG. 5 is a diagram illustrating a state transition table Table-2.

Next, details of the state transition table which is managed by the state transition managing unit 115 of the relay device 10 will be described with reference to FIGS. 4 and 5. FIG. 4 is a diagram illustrating an example of a state transition table Table-1 for managing an internal state of the relay device 10. FIG. 5 is a diagram illustrating an example of a state transition table Table-2 for managing a state of packet transmission/reception.

The table-1 is created for each client PC 20 at the time when a session between the relay device 10 and the delivery server 30 is established to enable the TFTP communication with the client PC 20. As illustrated in FIG. 4, the Table-1 has state information such as "ServerIP", "TargetIP", "TargetMAC", "Status" and "SessionNo".

The "ServerIP" is an IP address of the delivery server 30. The IP address of the delivery server 30 may be set in advance in the relay application.

The "TargetIP" is an IP address of a target client PC 20. Under the DHCP environment, the client PC 20 requests, in accordance with the BIOS, the DHCP server to assign an IP address, after turning ON the power by the WOL, and the IP address is notified from the DHCP server. When obtaining the image of the TFTP server, the client PC 20 notifies, in accordance with the BIOS, its own IP address to the relay device 10. The state transition managing unit 115 records the notified IP address of the client PC 20 in the "TargetIP".

The "TargetMAC" is a MAC address of the target client PC 20. The MAC address may be input to be set by the user through the manipulation display unit 104.

The "Status" indicates a status of the relay control unit 100. For example, "ON" in the "Status" indicates that the relay control unit 100 is in an active state, and "OFF" in the "Status" indicates that the relay control unit 100 is not activated or has ended the operation. "Pend" in the "Status" indicates that the communication is stopped and in a waiting state for reconnection, because an error in the communication protocol is detected by the error detecting unit 113.

The "SessionNo" indicates an identification number of a session established with the delivery server 30. The delivery server 30 may communicate with a plurality of relay devices via the network 60 so that when a session is established, the identification number which is allocated by the delivery server 30 is used to communicate with the delivery server 30.

The Table-2 is created for every packet received from the delivery server 30 using the first communication method, for each session identified by the identification number in the "SessionNo" of the Table-1. As illustrated in FIG. 5, the Table-2 includes state information of "Block_No", "Recv_SV", "Send_TG", "Recv_TG", "Send_SV", "End_Flag", "RetryCount1", and "RetryCount2".

The "Block_No" is a block number which indicates an order of the packets divided in the first communication method. The number of blocks of the packet varies depending on the size of the transmitted data and the size of the MTU.

The "Recv_SV" is a flag indicating that the relay device 10 receives the packet data from the delivery server 30. The "ON" indicates that the packet is received and "OFF" indicates that the packet is not received.

The "Send_TG" is a flag indicating that the relay device 10 transmits data to the client PC 20 using the second communication method. The "ON" indicates that data transmission is completed and the "OFF" indicates that data is not transmitted.

The "Recv_TG" is a flag indicating that the relay device 10 receives acknowledgement of receiving data using the second communication method from the client PC 20. The "ON" indicates that reception of acknowledgement is completed and "OFF" indicates that acknowledgement is not received.

The "Send_SV" is a flag indicating that the relay device 10 transmits ACK to the delivery server 30 using the first communication method. The "ON" indicates that transmission of ACK is completed and the "OFF" indicates that ACK is not transmitted.

The "End_Flag" is a flag indicating that a received packet is a final one of the divided packets. The "ON" indicates that the packet is the final packet and the "OFF" indicates that the packet is not the final packet.

The "RetryCount1" is a timer value counted until a next packet is received after transmitting the ACK to the delivery server 30 using the first communication method, and for example, an integer is input and incremented.

The "RetryCount2" is a timer value counted until the relay device 10 receives ACK from a client PC 20 after transmitting data to the client PC 20 using the second communication method and for example, an integer is input and incremented.

Figure 6:
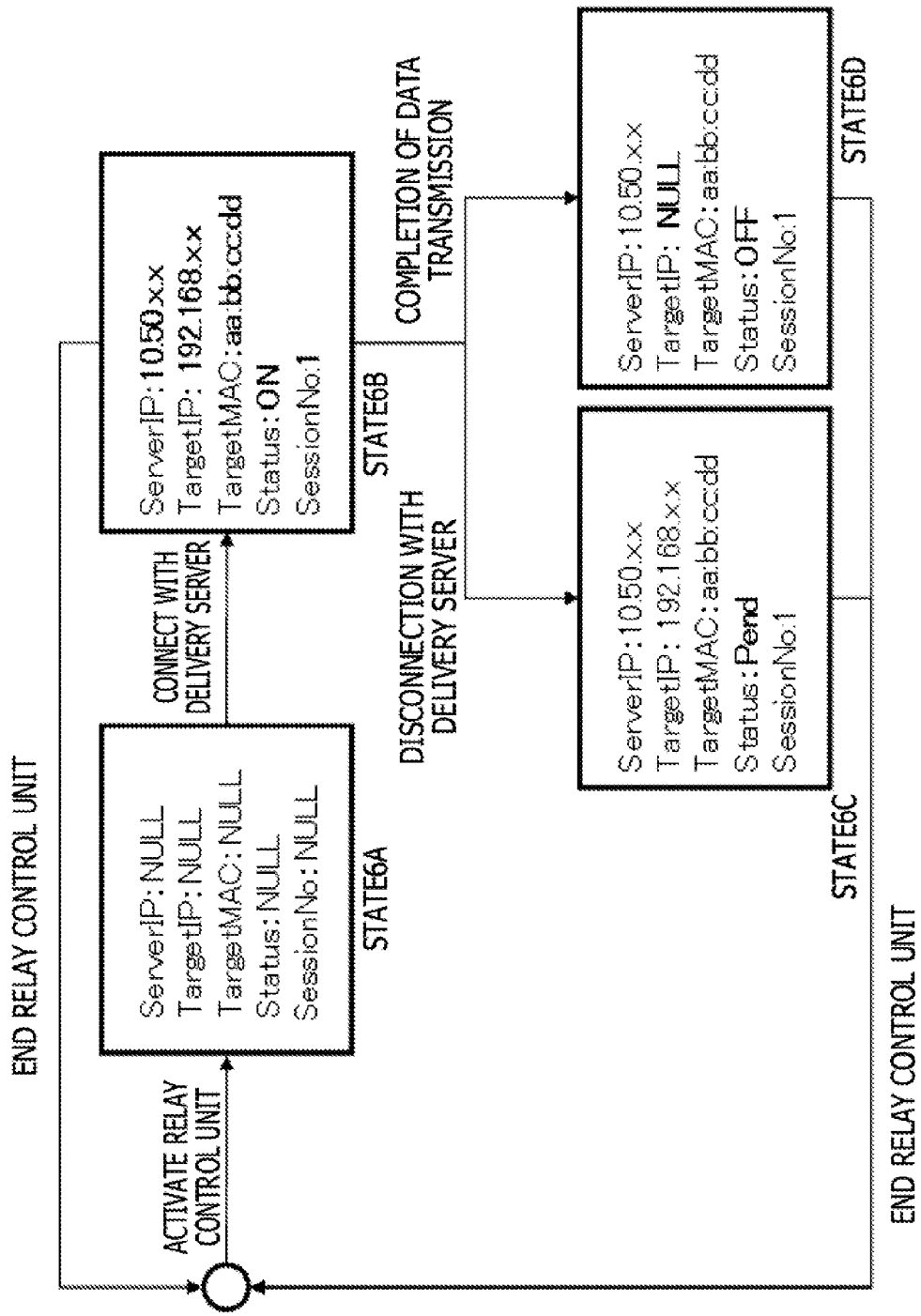
FIG. 6 is a diagram illustrating state transition of Table-1.

Next, transition of the Table-1 illustrated in FIG. 4 in accordance with the state of the relay control unit 100 will be described with reference to FIG. 6. FIG. 6 is a diagram illustrating an example of state transition of the Table-1.

Referring to FIG. 6, STATE6A to STATE6D indicate states of the Table-1.

STATE6A is a state of the Table-1 when the relay control unit 100 is activated and indicates an initial state. The values of the "ServerIP", the "TargetIP", the "TargetMAC", the "Status", and the "SessionNo" are "NULL".

STATE6B indicates a state of the Table-1 after the relay control unit 100 is connected with the delivery server 30 to establish the session. The "ServerIP" includes an IP address "10.50.x.x" of the delivery server 30. The "TargetIP" and the "TargetMAC" include an IP address and a MAC address, respectively, of the client PC 20, for example, "192.168.x.x" and "aa.bb.cc.dd", respectively. As the relay control unit 100 is activated, the "Status" is "ON" and "1" is input to the "SessionNo".

STATE6B is created for every client PC 20. STATE6B may be likened to an "actual status" of the Table-1 against STATE6A as a "format" of the Table-1. Therefore, when the number of the client PCs 20 is n, STATE6A and STATE6B have a relationship of 1:n in the number.

STATE6C indicates a state of the Table-1, for example, when the connection with the delivery server 30 is lost so that an error is caused in the communication using the first communication method. In STATE6C, the "Status" is changed from the state of STATE6B into "Pend".

STATE6D indicates a state when the data transmission to the client PC 20 is completed. The "TargetIP" is "NULL"

and the "Status" is "OFF". However, the communication with the delivery server 30 is not disconnected and the session is still established so that the value of the "SessionNo" remains as it is.

When the relay control unit 100 ends, the Table-1 disappears.

Figure 7:
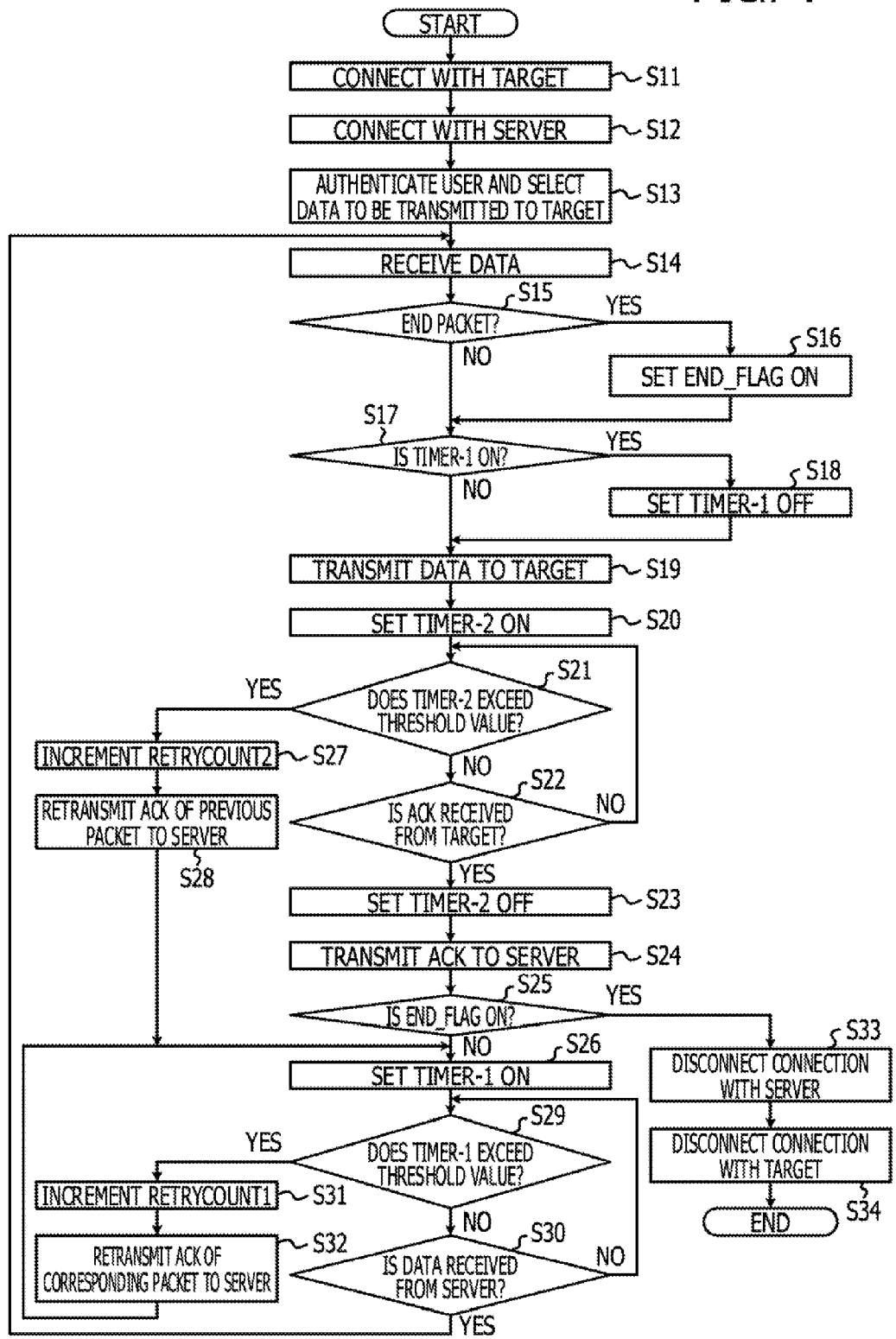
FIG. 7 is a flowchart illustrating an operation of a relay control unit.

Next, details of an operation of the relay control unit 100 will be described with reference to FIG. 7. FIG. 7 is a flowchart illustrating an example of an operation of the relay control unit 100.

Referring to FIG. 7, the relay control unit 100 is connected to a target client PC 20 using the TFTP which is the second communication method (S11). In the TFTP, the UDP is used on the transport layer.

Next, the relay control unit 100 is connected with the delivery server 30 using the TCP which is the first communication method (S12). For example, HyperText Transfer Protocol (HTTP) is used as a communication protocol implemented in a hierarchy of the TCP. When the session with the delivery server 30 is established, for example, the communication may be encrypted by a Secure Sockets Layer (SSL). When the delivery server 30 has an SSL-virtual private network (VPN) function, a system image may be transmitted or received by the SSL-VPN communication if the relay device 10 is SSL compatible.

Next, the user authentication for the delivery server 30 and selection of data to be transmitted to the target client PC 20 are performed (S13). The delivery server 30 provides the relay device 10 with a Web based user interface (UI) for user authentication.

Figure 8:
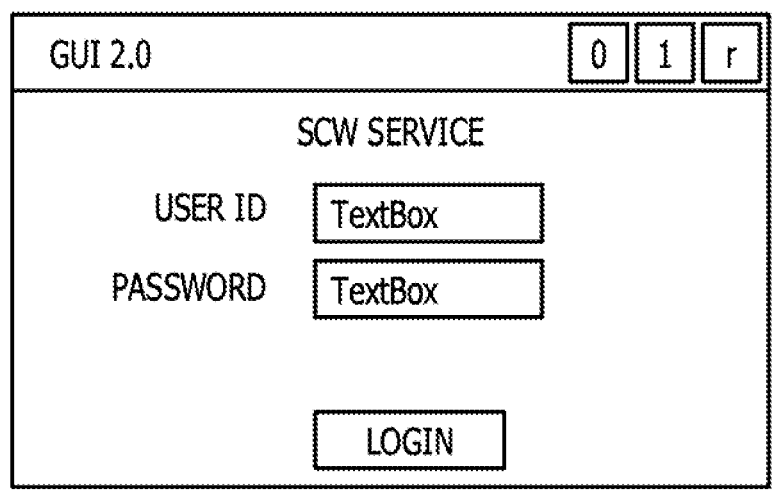
FIG. 8 is a diagram illustrating a user authentication screen.

FIG. 8 is a diagram illustrating an example of a user authentication screen which is displayed on the manipulation display unit 104 of the relay device 10. Referring to FIG. 8, the delivery server 30 provides a web page which displays a log-in screen of a service which delivers a system image. A user identifier (ID) and a password are input on the log-in screen.

Figure 9:
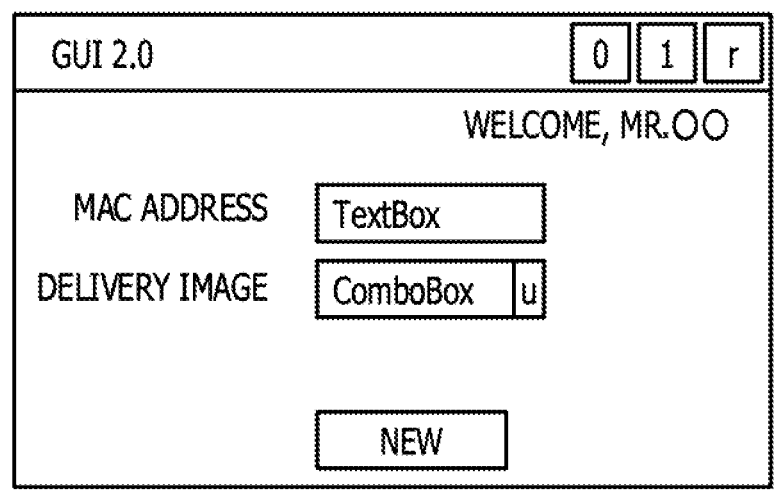
FIG. 9 is a diagram illustrating a screen for selecting a client PC and a delivery image.

FIG. 9 is a diagram illustrating an example of a screen for selecting a client PC 20 and a delivery image, which is provided by the relay control unit 100. In FIG. 9, the user selects a MAC address of the client PC 20 and a delivery image to be delivered. The delivery image is selected using a list box. Information on the delivery image is transmitted from the connected delivery server 30.

When the user presses a "New" button, the Table-1 is in the state of STATE6B illustrated in FIG. 6. In the present embodiment, as a selectable delivery image, a system image for restoring the client PC 20 is selected. However, the delivery image may be any other data.

Returning to FIG. 7, when the packet data is received from the delivery server 30 (S14), the relay control unit 100 determines whether the received packet is an END packet (S15). Whether the received packet is an END packet may be determined by checking a "flag" field of the packet header. When it is determined that the received packet is an END packet (Yes in S15), the "End_Flag" illustrated in FIG. 5 is set "ON" (S16).

Figure 10:
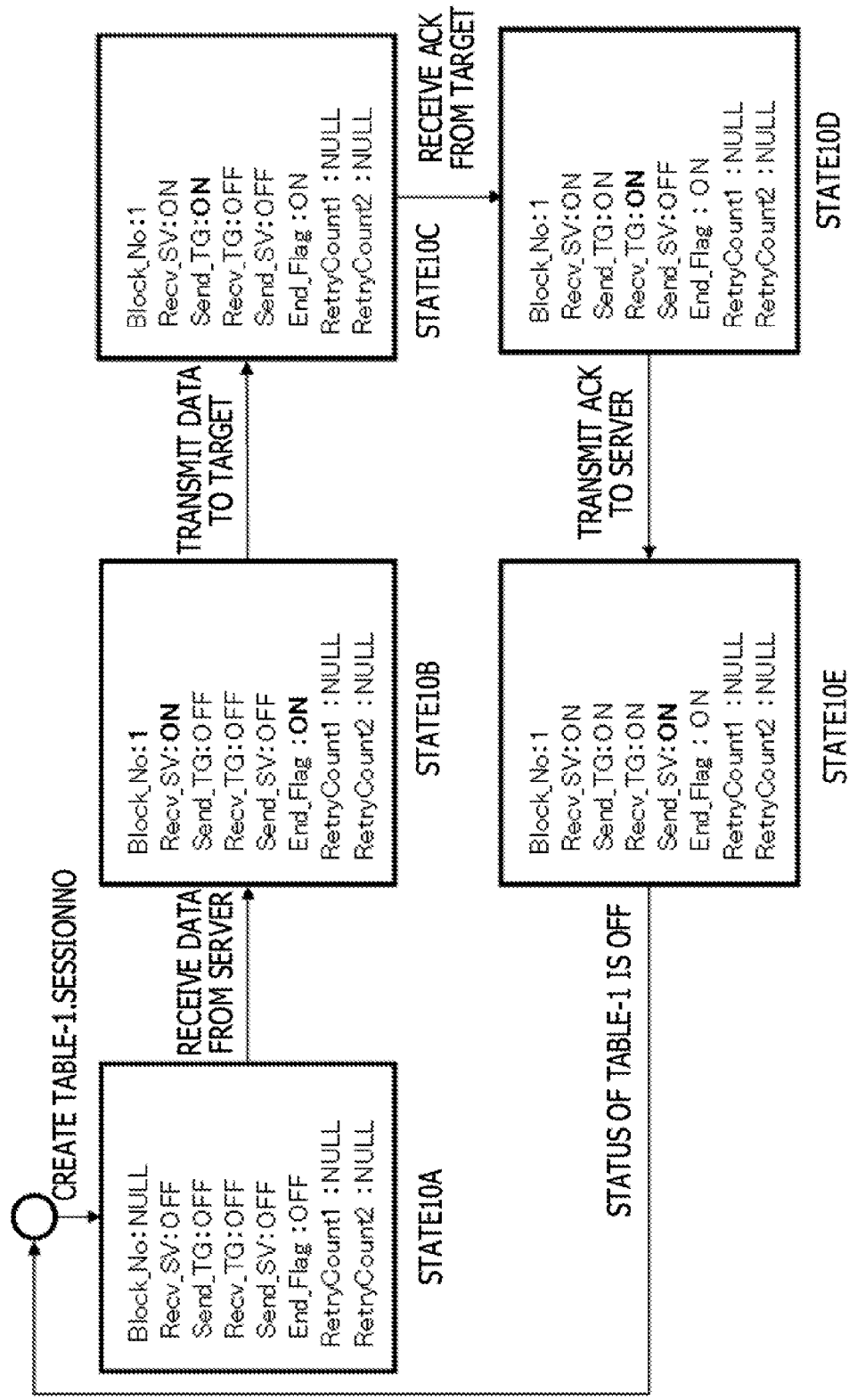
FIG. 10 is a diagram illustrating state transition of Table-2 when an END packet is received.

The transition of the Table-2 when the received packet is an END packet will be described with reference to FIG. 10. FIG. 10 is a diagram illustrating an example of state transition of the Table-2 when an END packet is received.

In FIG. 10, STATE10A is the initial state of the Table-2 illustrated in FIG. 5 and "OFF" or "NULL" are input to respective states. STATE10B indicates a state of the Table-2 in the case of Yes in S15. In STATE10B, the "Block_No" is "1", the "Recv_SV" is "ON", and the "End_Flag" is "ON".

Returning to FIG. 7, when the received packet is not the END packet (No in S15), the "End_Flag" is still "OFF".

Figure 11:
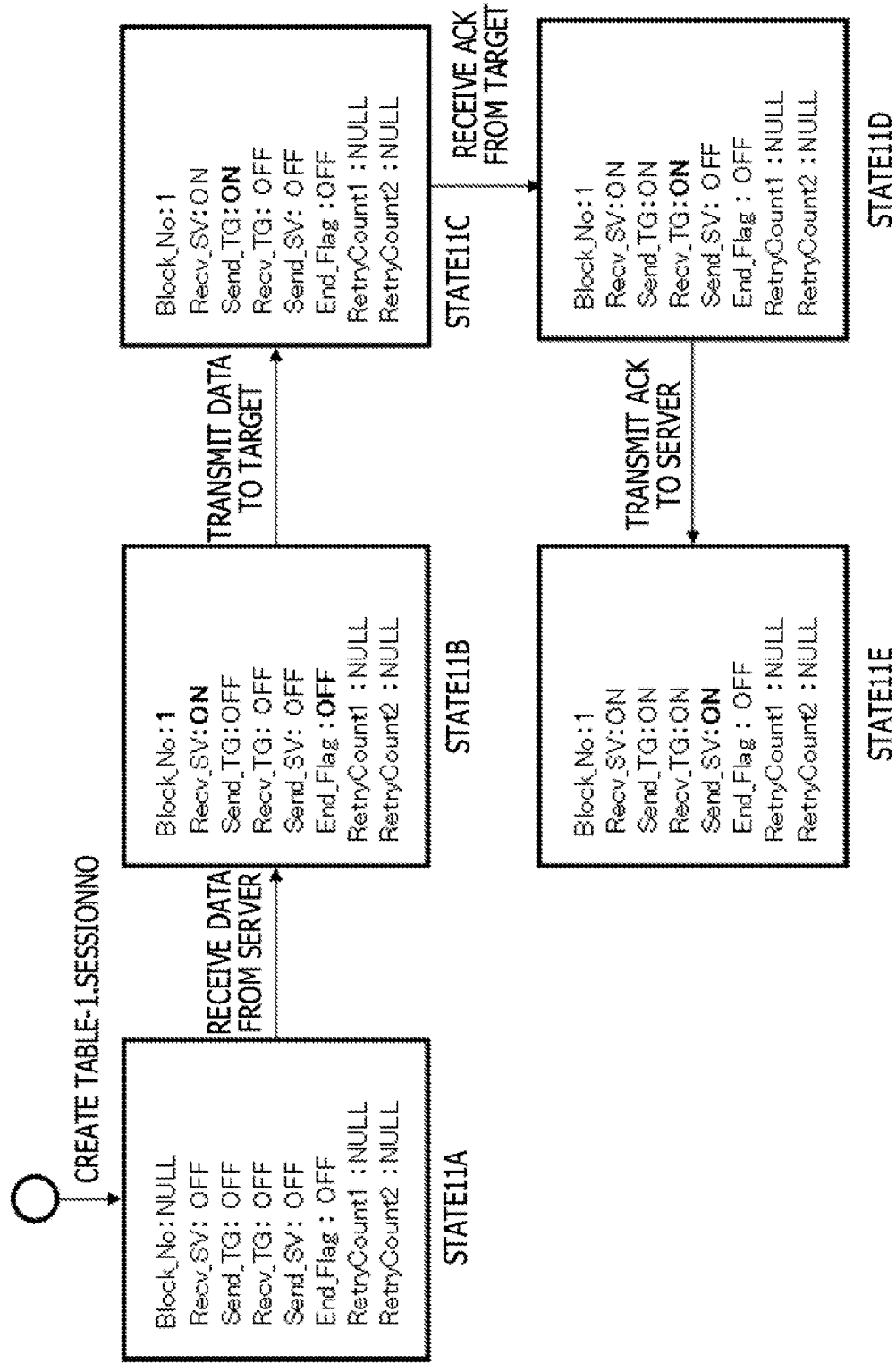
FIG. 11 is a diagram illustrating state transition of Table-2 when a packet other than an END packet is received.

The transition of the Table-2 when the received packet is not the END packet, that is, when a next packet is present, will be described with reference to FIG. 11. FIG. 11 is a diagram illustrating an example of state transition of the Table-2 when a packet which is not the END packet is received.

In FIG. 11, STATE11A is the initial state of the Table-2 illustrated in FIG. 5 and "OFF" or "NULL" is input to each state.

STATE11B indicates a state of the Table-2 in the case of No in S15. In STATE11B, the "Block_No" is "1", the "Recv_SV" is "ON", but the "End_Flag" is still "OFF".

Returning to FIG. 7, when a timer-1 is on (Yes in S17), the timer-1 is set OFF and thus, the timer-1 is reset (S18). The timer-1 is a timer for detecting an error in the communication with the delivery server 30. When the timer-1 is ON, the count is performed by the "RetryCount1" of the Table-2 illustrated in FIG. 5.

Next, the packet data is transmitted to the target client PC 20 (S19) and a timer-2 is set ON (S20). After the packet data is transmitted to the target client PC 20, the state of the Table-2 transits to STATE10C of FIG. 10 or STATE11C of FIG. 11. In STATE10C and STATE11C, the state of the "Send_TG" is "ON".

Next, it is determined whether the timer-2 exceeds a predetermined threshold value (S21). When it is determined that the timer-2 does not exceed the threshold value (No in S21), it is determined whether an ACK is received from the target client PC 20 (S22). The flowchart loops until the timer-2 exceeds the threshold value or an ACK is received.

When an ACK is received from the target (Yes in S22), the timer-2 is set OFF (S23). After the ACK is received, the state of the Table-2 transits to STATE10D of FIG. 10 in which the state of the "Recv_TG" is "ON".

Next, the ACK is transmitted to the delivery server 30 (S24). After the ACK is transmitted, the state of the Table-2 transits to STATE10E of FIG. 10 in which the state of the "Send_SV" is "ON".

Next, it is determined whether the "End_Flag" which is manipulated in S16 is "ON" (S25). When it is determined that the "End_Flag" is not "ON" (No in S25), the timer-1 is set ON (S26). That is, when there is a next packet, the timer-1 starts timing.

Next, it is determined whether the timer-1 exceeds a predetermined threshold value (S29). When it is determined that the timer-1 does not exceed the predetermined threshold value (No in S29), it is determined whether next data is received from the delivery server 30 (S30). The flowchart loops until the timer-1 exceeds the predetermined threshold value (Yes in S29) or the next data is received from the delivery server 30. When the next data is received from the delivery server 30 (Yes in S30), the flowchart returns to S14 to perform the processing on the next packet data.

When the timer-1 exceeds the predetermined threshold value (Yes in S29), the "RetryCount1" is incremented by 1 (S31) and the ACK of the packet corresponding to the block number written in the "Block_No" of the Table-2 is retransmitted to the delivery server 30 (S32).

Figure 12:
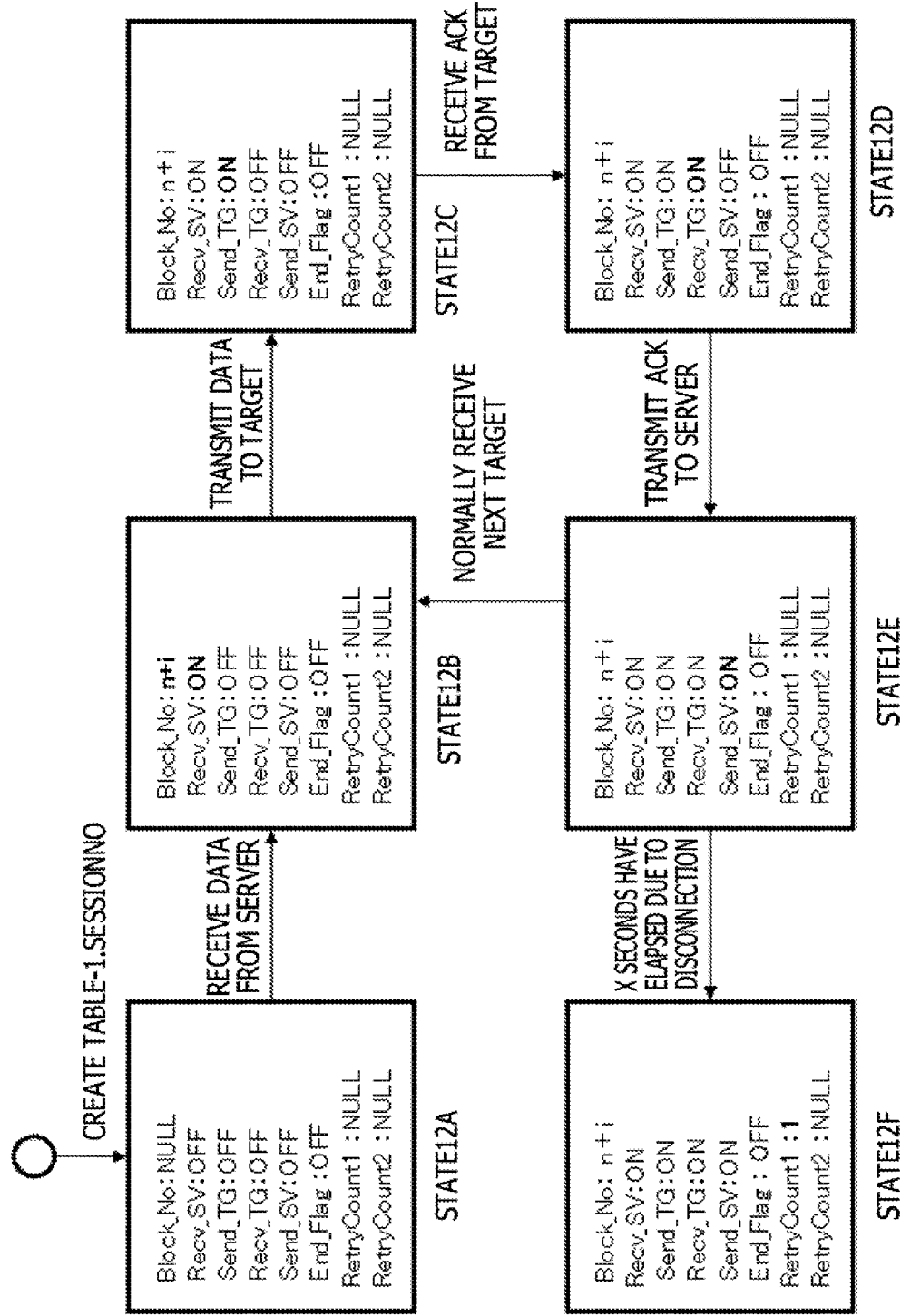
FIG. 12 is a diagram illustrating state transition of Table-2 when a communication error with a delivery server occurs.

The state transition of the Table-2 when the timer-1 exceeds the predetermined threshold value (Yes in S29) will be described with reference to FIG. 12. FIG. 12 is a diagram illustrating an example of the state transition of the Table-2 when a communication error in the communication with the delivery server 30 occurs.

In FIG. 12, the states of STATE12A to STATE12E are similar to the states of STATE11A to STATE11E illustrated in FIG. 11. However, in FIG. 12, it is assumed that "n+i" is input as the "Block_No". The symbol "n" indicates the n-th packet, and the symbol i is a variable which increments the number of the packet by one. In the state of STATE12E, when the next packet data is received from the delivery server 30 in S30 of FIG. 7 (Yes in S30), the symbol i is incremented to i+1 and the state transits to STATE12B.

By contrast, when the timer-1 exceeds the predetermined threshold value (Yes in S29), the state transits to STATE12F in which the "RetryCount1" is incremented by one (S31), as described above. And the ACK is retransmitted for the n+i-th packet to the delivery server 30.

Figure 13:
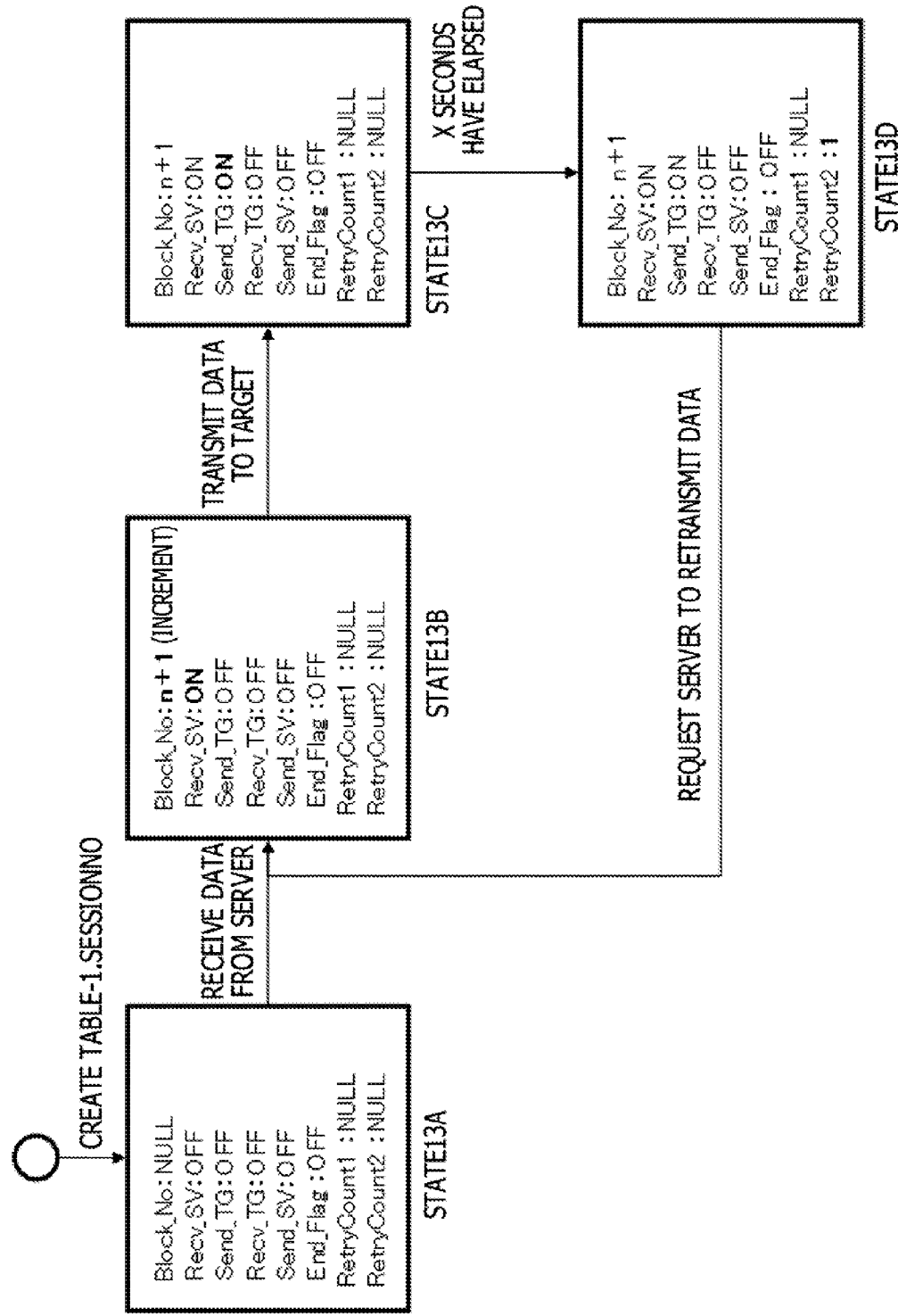
FIG. 13 is a diagram illustrating state transition of Table-2 when a communication error with a client PC occurs.

Returning to FIG. 7, when the timer-2 exceeds the predetermined threshold value in S21 (Yes in S21), the "RetryCount2" is incremented by one (S27) and the ACK for the packet of a previous block is retransmitted to the delivery server 30 (S28). The state transition of the Table-2 when the timer-2 exceeds the predetermined threshold value in S21 will be described with reference to FIG. 13. FIG. 13 is a diagram illustrating an example of state transition of the Table-2 when a communication error in the communication with the PC occurs.

In FIG. 13, the states of STATE13A to STATE13C are similar to the states of STATE11A to STATE11C illustrated in FIG. 11. However, in FIG. 13, it is assumed that "n+1" is input as the "Block_No". When the timer-1 exceeds the predetermined threshold value, the state transits from STATE13C to STATE13D. The "RetryCount2" is incremented, that is, one is input as the "RetryCount2". The ACK for a previous block, whose "Block_No" is n, of the block whose "Block_No" is n+1 is retransmitted to the delivery server 30.

Returning to FIG. 7, in S25, when the "End_Flag" is "ON" (Yes in S25), there is no next packet, so that the connection with the delivery server 30 is disconnected (S33). Further, the connection with the target client PC 20 is disconnected (S34) and the operation illustrated in the flowchart of FIG. 7 ends.

Figure 14:
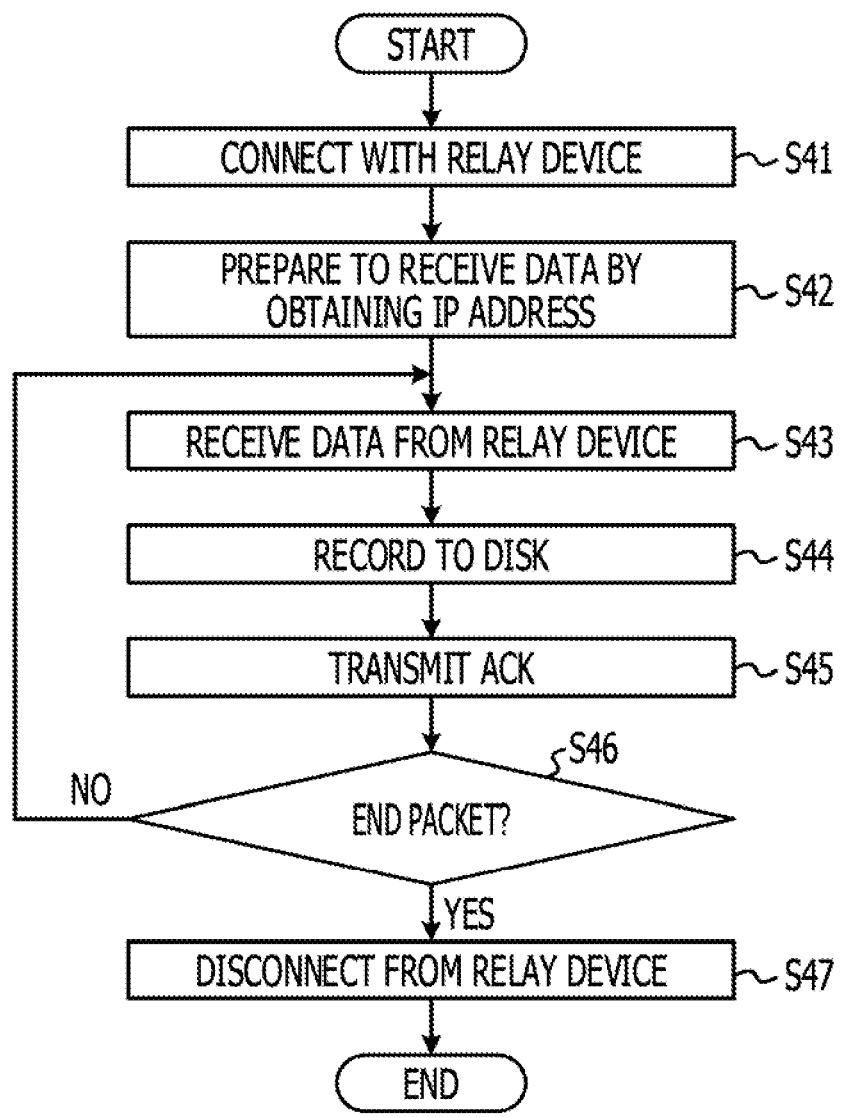
FIG. 14 is a flowchart illustrating an operation of a client PC.

Next, the operation of the target client PC 20 will be described with reference to FIG. 14. FIG. 14 is a flowchart illustrating an example of an operation of the client PC 20.

In FIG. 14, the client PC 20 is connected with the relay device 10 (S41). In the present embodiment, the relay device 10 broadcasts a magic packet by designating an MAC address of a target client PC 20 and transmits the system image of the TFTP server to enable the communication using the TFTP.

Next, the relay device 10 notifies the IP address for obtaining the system image and the client PC 20 transmits to the obtained IP address a request for transmitting the system image using the TFTP (S42). The client PC 20 receives packet data from the relay device 10 (S43), records the received data in a disk (S44), and transmits an ACK to the relay device 10 (S45).

The client PC 20 determines whether the received packet is an END packet (S46) and when it is determined that the received packet is not the END packet (No in S46), S43 to S45 are repeated. If the received packet is the END packet (Yes in S46), the communication with the relay device 10 is disconnected (S47) and the operation illustrated in the flowchart of FIG. 14 ends.

Figure 15:
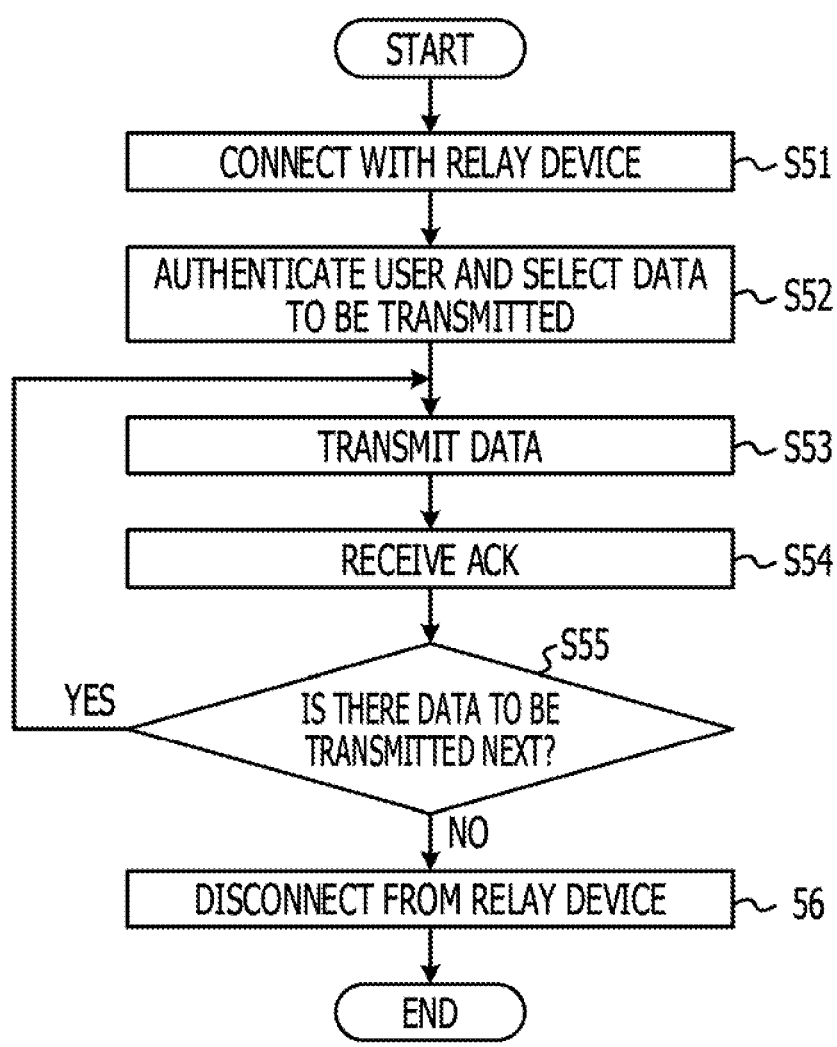
FIG. 15 is a flowchart illustrating an operation of a delivery server.

Next, the operation of the delivery server 30 will be described with reference to FIG. 15. FIG. 15 is a flowchart illustrating an example of the operation of the delivery server 30.

In FIG. 15, the relay device 10 designates an IP address or a uniform resource locator (URL) of the delivery server 30 to be connected to the delivery server 30 (S51).

Next, the delivery server 30 provides, by the web server of the delivery server 30, a web page (illustrated in FIG. 8) for authentication and a web page (illustrated in FIG. 9) for selecting the system image to be transmitted (S52).

The delivery server 30 transmits packet data of the system image to the relay device 10 (S53) and receives an ACK from the relay device 10 (S54).

The delivery server 30 determines whether there is a packet to be transmitted next among the packets obtained by dividing data to be transmitted (S55). When it is determined that there is a packet to be transmitted next (Yes in S55), S53 and S54 are repeated. When there is no packet to be transmitted next (No in S55), the communication with the relay device 10 is disconnected (S56) and the operation illustrated in the flowchart of FIG. 15 ends.

Figure 16:
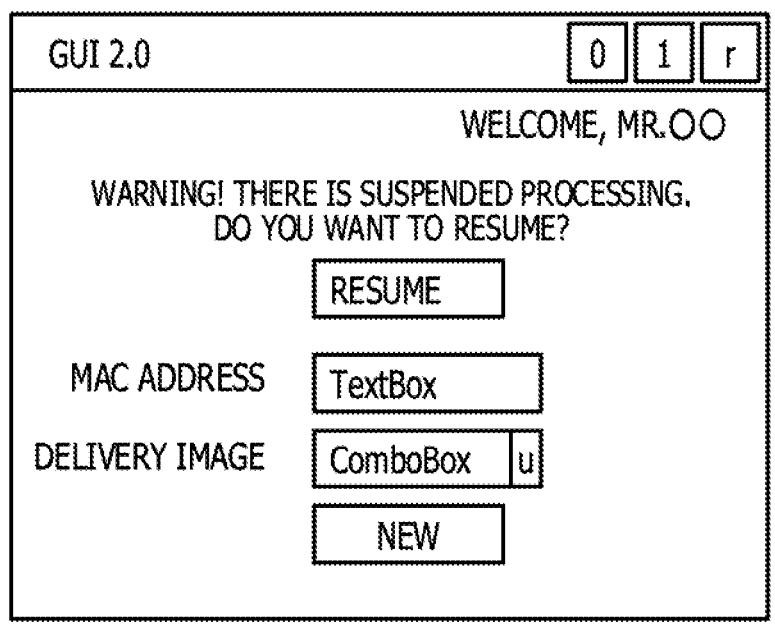
FIG. 16 is a diagram illustrating a reconnection screen of a network.

If there are remaining packets to be transmitted due to a communication error, the delivery server 30 provides a web page for resuming the processing to the relay device 10 (S52). FIG. 16 is a diagram illustrating an example of a screen for reconnecting a network, which is provided by the web server of the delivery server 30.

In FIG. 16, the reconnection screen includes an input slot of the MAC address of the target client PC 20 and a list box for selecting an image to be delivered. When a "resume" button is pressed by the user, the transmission is resumed from data of a packet for which the delivery server 30 has not received an ACK. By contrast, when a "new" button is pressed, the delivery image is transmitted from the top.

In the present embodiment, the delivery server 30 may manage information of the packet which is not yet transmitted. The relay device 10 may designate to the delivery server 30, based on the information of the state transition table of the relay device 10, a packet with which the transmission needs to be resumed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium having stored therein a program for causing a computer to execute a process, the process comprising:
receiving, using a first communication method, first data transmitted from a first information processing device;
transmitting, using a second communication method different from the first communication method, the first data to a second information processing device different from the first information processing device;
receiving, using the second communication method, a reception acknowledgement for the first data from the second information processing device;
transmitting, using the first communication method, the reception acknowledgement to the first information processing device;
detecting one of a first error and a second error, the first error being an error in communication between the computer and the first information processing device, the second error being an error in communication between the computer and the second information processing device; and retransmitting, based on the detected error, one of reception acknowledgements that have been transmitted to the first information processing device before detecting the one of a first error and a second error.

2. The computer-readable recording medium according to claim 1, wherein the program causes the computer to retransmit, upon detecting the second error after transmitting currently received data to the second information processing device, a reception acknowledgement for data received immediately prior to the currently received data to the first information processing device.

3. The computer-readable recording medium according to claim 1, wherein the program causes the computer to retransmit, upon detecting the first error after transmitting a first reception acknowledgement for currently received data to the first information processing device, the first reception acknowledgement to the first information processing device.

4. The computer-readable recording medium according to claim 1, the process further comprising:

broadcasting, using the second communication method, a packet for activating the second information processing device.

5. A relay device, comprising:

a processor configured to receive, using a first communication method, first data transmitted from a first information processing device, transmit, using a second communication method different from the first communication method, the first data to a second information processing device different from the first information processing device, receive, using the second communication method, a reception acknowledgement for the first data from the second information processing device, transmit, using the first communication method, the reception acknowledgement to the first information processing device, detect one of a first error and a second error, the first error being an error in communication between the relay device and the first information processing device, the second error being an error in communication between the relay device and the second information processing device, and retransmit, based on the detected error, one of reception acknowledgements that have been transmitted to the first information processing device before detecting the one of a first error and a second error.

6. The relay device according to claim 5, wherein the processor is configured to retransmit, upon detecting the second error after transmitting currently received data to the second information processing device, a reception acknowledgement for data received immediately prior to the currently received data to the first information processing device.

7. The relay device according to claim 5, wherein the processor is configured to retransmit, upon detecting the first error after transmitting a first reception acknowledgement for currently received data to the first information processing device, the first reception acknowledgement to the first information processing device.

8. The relay device according to claim 5, wherein the processor is further configured to broadcast, using the second communication method, a packet for activating the second information processing device.

9. A relay method, comprising:

receiving by a computer, using a first communication method, first data transmitted from a first information processing device;

transmitting, using a second communication method different from the first communication method, the first data to a second information processing device different from the first information processing device;

receiving, using the second communication method, a reception acknowledgement for the first data from the second information processing device;

transmitting, using the first communication method, the reception acknowledgement to the first information processing device;

detecting one of a first error and a second error, the first error being an error in communication between the computer and the first information processing device, the second error being an error in communication between the computer and the second information processing device; and retransmitting, based on the detected error, one of reception acknowledgements that have been transmitted to the first information processing device before detecting the one of a first error and a second error.

10. The relay method according to claim 9, wherein the computer retransmits, upon detecting the second error after transmitting currently received data to the second information processing device, a reception acknowledgement for data received immediately prior to the currently received data to the first information processing device.

11. The relay method according to claim 9, wherein the computer retransmits, upon detecting the first error after transmitting a first reception acknowledgement for currently received data to the first information processing device, the first reception acknowledgement to the first information processing device.

12. The relay method according to claim 9, further comprising:

broadcasting, using the second communication method, a packet for activating the second information processing device.

* * * * *